(12) United States Patent
Thorson et al.

(10) Patent No.: US 10,824,188 B2
(45) Date of Patent: Nov. 3, 2020

(54) MULTICHIP TIMING SYNCHRONIZATION CIRCUITS AND METHODS

(71) Applicant: Groq, Inc., Menlo Park, CA (US)

(72) Inventors: Gregory Michael Thorson, Palo Alto, CA (US); Srivathsa Dhruvanarayan, Saratoga, CA (US)

(73) Assignee: Groq, Inc., Mountain View, CA (US)

( * ) Notice: Subject to any disclaimer, the term of this patent is extended or adjusted under 35 U.S.C. 154(b) by 81 days.

(21) Appl. No.: 16/247,053

(22) Filed: Jan. 14, 2019

(65) Prior Publication Data

US 2020/0225693 A1    Jul. 16, 2020

(51) Int. Cl.
    *G06F 1/12*   (2006.01)
    *G06N 5/02*   (2006.01)
(52) U.S. Cl.
    CPC .............. *G06F 1/12* (2013.01); *G06N 5/02* (2013.01)
(58) Field of Classification Search
    CPC ..... G06F 1/12; G06F 1/14; G06F 1/10; G06F 5/06; G06F 13/1689; G06F 1/08; G06F 1/04; G06F 1/3202; G06F 9/4825; G06F 11/0757; G06F 11/3419; G11C 7/22
    See application file for complete search history.

(56) References Cited

U.S. PATENT DOCUMENTS

| | | | |
|---|---|---|---|
| 2007/0091714 A1* | 4/2007 | Fujisawa | G11C 11/4076 365/233.17 |
| 2009/0222683 A1* | 9/2009 | Serebrin | G06F 1/14 713/375 |
| 2015/0277989 A1* | 10/2015 | Laborde | G06F 11/30 718/107 |
| 2017/0231508 A1 | 8/2017 | Edwards et al. | |
| 2018/0088625 A1 | 3/2018 | Krithivas et al. | |
| 2018/0196465 A1* | 7/2018 | Sharpe-Geisler | H04L 7/04 |
| 2019/0056976 A1* | 2/2019 | Gebauer | G06F 9/30 |

FOREIGN PATENT DOCUMENTS

EP    3156904 A1    4/2017

OTHER PUBLICATIONS

PCT International Search Report and Written Opinion, PCT Application No. PCT/US2020/012926, dated May 8, 2020, 15 pages.

* cited by examiner

*Primary Examiner* — Zahid Choudhury
(74) *Attorney, Agent, or Firm* — Fenwick & West LLP

(57) ABSTRACT

In one embodiment, the present disclosure includes multichip timing synchronization circuits and methods. In one embodiment, hardware counters in different systems are synchronized. Programs on the systems may include synchronization instructions. A second system executes synchronization instruction, and in response thereto, synchronizes a local software counter to a local hardware counter. The software counter on the second system may be delayed a fixed period of time corresponding to a program delay on the first system. The software counter on the second system may further be delayed by an offset to bring software counters on the two systems into sync.

20 Claims, 6 Drawing Sheets

MULTICHIP TIMING SYNCHRONIZATION CIRCUITS AND METHODS

BACKGROUND

The present disclosure relates to timing in electronic systems, and in particular, to multichip timing synchronization circuits and methods.

Electronic systems often run synchronously, where events in the system occur at regular intervals typically driving by a clock. When two different systems are working together, the clock cycles may drift apart, causing the systems to lose a common time base. When two systems lose a common time base, synchronization may be lost (e.g., the systems are "out of sync"), and the two system may experience errors in interacting and may even result in system failure.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Figure 1:
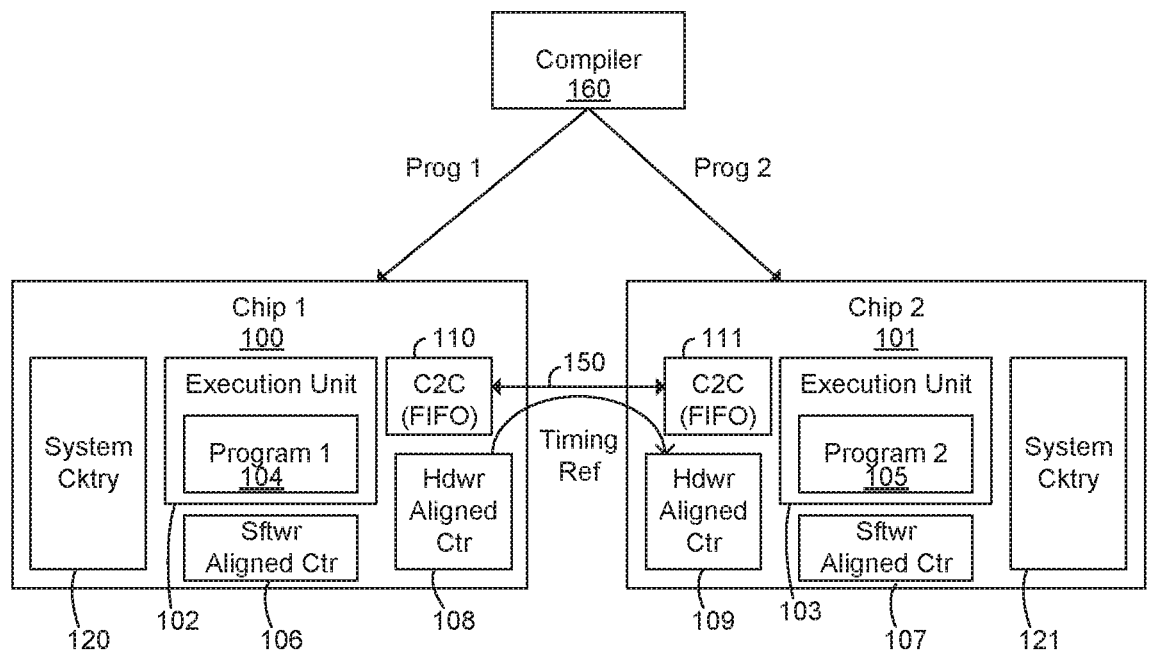
FIG. 1 illustrates timing synchronization between two systems according to one embodiment.

FIG. 1 illustrates timing synchronization between two systems according to one embodiment. Features and advantages of the present disclosure include techniques for synchronizing a plurality of systems. In one embodiment, the systems may be multiple chips, such as multiple integrated circuits coupled together through an interface, such as a high speed digital communications channel, for example. FIG. 1 illustrates an example of two chips, chip 1 100 and chip 2 101, coupled together over a data communications link 150. Data communications link 150 may be a media independent interface such as an "xgmii" interface, for example. Chips 100 and 101 may be integrated circuits (ICs) in separate packages, IC's bonded together in a multichip module, or other systems that interact in a coordinated manner over a high speed data link fast enough to support multi-system synchronization, for example.

Chips 100 and 101 may each include chip-to-chip (C2C) interface circuitry 110 and 111, system circuitry 120 and 121, and execution units 102 and 103 for executing programs 104 and 105, for example. System circuitry 120 and 121 may include particular functionality relating to the overall function of each chip. One example application of the present disclosure pertains to artificial intelligence systems and circuitry as illustrated in more detail below. Programs 104 and 105 may control operation of the system circuitry to execute software algorithms, and may further include functionality that causes various forms of interaction between chips 100 and 101, such as moving data back and forth between the systems. Programs 104 and 105 may coordinate execution of a distributed algorithm generated by a compiler 160 for processing of data on multiple chips, and thus may send data between the systems synchronously, for example. Accordingly, it may be advantageous to have synchronization techniques between the systems that allow the systems to interact as specified in each program 104 and 105, for example.

In one embodiment, each system 100 and 101 may include hardware aligned counters 108 and 109. Hardware aligned counters 108 and 109 may be used to establish a time base for electronic circuitry in each system, such as a clock, for example. Additionally, each system may include software aligned counters 106 and 107. Software aligned counters 106 and 107 may be synchronized by programs 104 and 105, respectively, as described in more detail below. Hardware aligned counters 108 and 109 and software aligned counters 106 and 107 may be implemented as digital counter circuits, for example, on each integrated circuit. For instance, hardware aligned counters 108 and 109 may be free running digital counters (e.g., 8-bit counters) on Chip 1 and Chip 2 that are synchronized periodically as described below. Similarly software aligned counters 106 and 107 may be digital counters (e.g., 8-bit counters) that synchronized based on timing markers triggered by programs 104 and 105, respectively. Hardware aligned counters are referred to herein as "hardware counters" and software aligned counters are referred to herein as "software counters." One challenge with hardware and software counters is that different counters on different systems may drift apart over time. For example, even if the same external crystal is used to drive both hardware counters, different internal conditions may cause the hardware counters to move out of sync over time. Additionally, software counters may similarly drift apart over time. Synchronization may also be impacted during data communications by latency in the system and jitter which may span multiple cycles, for example. Accordingly, keeping the system hardware and software counters in sync can be a challenge.

Figure 2:
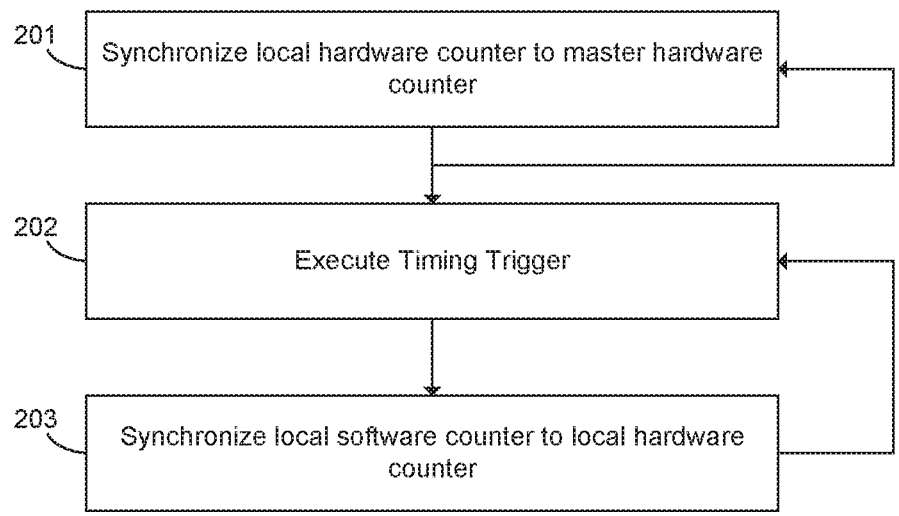
FIG. 2 illustrates a method of synchronizing two systems according to one embodiment.

Features and advantages of the present disclosure include synchronizing both hardware and software counters across multiple systems to ensure stable communications and interaction between the systems. For example, FIG. 2 illustrates a method of synchronizing two systems according to one embodiment. At 201, the hardware counters 108 and 109 are synchronized. Synchronizing the hardware counters 108 and 109 may occur periodically during the operation of each system and may occur at a higher frequency than synchronizing software counters as described below, for example. In some embodiments, one system is designated as the master and the other system is designated as the slave. Synchronizing hardware counters may include the master system (here, system 100) sending a timing reference (e.g., timing bits representing a time stamp) to the slave system (here, system 101) over link 150. In one embodiment, system 100 may send an 8-bit time stamp, for example. The hardware counter 108 and software counter 106 on system 100 may be maintained in sync locally by system 100. However, as the hardware counter 109 on system 101 is synchronized to the hardware counter 108 on system 100, the software counter 107 may drift.

Embodiments of the disclosure may advantageously include programs 104 and 105 that include timing markers arranged throughout each program. As each program is executed, timing markers may be sequentially triggered (e.g., at predetermined positions in each program corresponding to particular points of time or particular cycles). Advantageously, the timing markers in each program may be configured to trigger on the same cycle in each system. For example, program 104 may trigger a timing marker on the same cycle as program 105 when chips 100 and 101 are synchronized. Accordingly, such timing markers in each program may be said to be arranged at temporally coincident points in each program, for example. In one embodiment, these timing markers may be used to synchronize software counters 106 and 107 because each program should, when in sync, execute corresponding timing markers at the same time, for example. Timing differences between the timing markers may correspond to a particular time difference (e.g., how out of sync the two programs are).

Referring again to FIG. 2, when program 105 reaches a timing marker, a timing trigger is executed. When a timing trigger is executed on system 101, at 202, local software counter 107 on system 101 may synchronize to local hardware counter 109 as shown at 203, for example. Since the hardware counters 108 and 109 are synchronized, the local hardware counter 109 provides a reference corresponding to the time base in system 100. In one embodiment, when a timing marker is reached by each program, a predetermined delay is executed. For example, each software counter 106 and 107 may stop for a predetermined delay time. However, the predetermined delay for software counter 107 may be adjusted based on a difference between a value in the software counter 107 and a value in the hardware counter 109. Since the hardware counters are synchronized in both systems 100 and 101, and since the hardware counter 108 is synchronized to the software counter 106 in system 100, a difference between the value in software counter 107 and hardware counter 109 corresponds to a difference between software counter 107 and software counter 106. Thus, increasing or decreasing the predetermined delay in software counter 107 based on a difference between values in software counter 107 and hardware counter 109 may synchronize software counter 107 with software counter 106.

Figure 3:
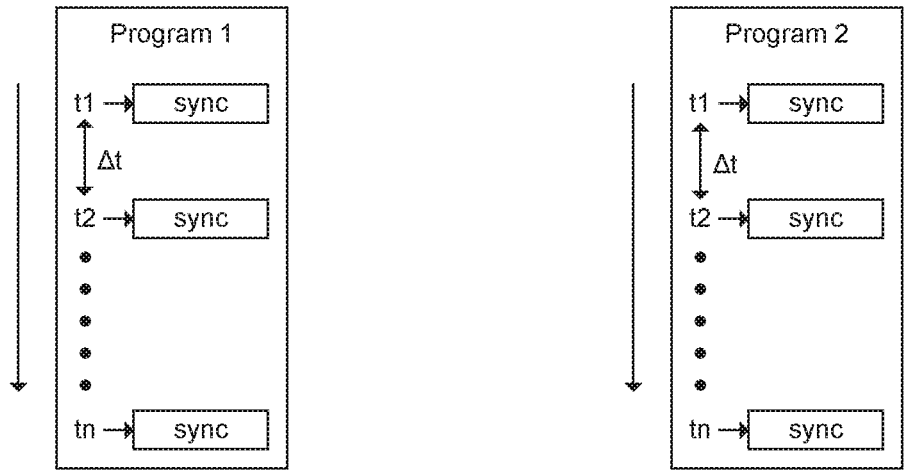
FIG. 3 illustrates software timing markers according to one embodiment.

FIG. 3 illustrates software timing markers according to one embodiment. In this example, program 1 is running on a first system (e.g., chip 100A) and program 2 is running on a second system (e.g., chip 100B). Programs 1 and 2 may include a plurality of timing markers (e.g., t1, t2, . . . , tn) that are executed as part of each programs execution flow. In one embodiment, the timing markers are distributed throughout the program, and may be distributed at regular intervals, for example. In this example, program 1 is running on a master system and program 2 is running on a slave system. Accordingly, when each timing marker is reached in program 1, the timing marker causes an instruction (e.g., a sync instruction) to be executed on the master system. The instruction on the master system may cause the software counter in the master system to stop for a predetermined period of time (e.g., a fixed delay), for example. Similarly, in this example, when each timing marker is reached in program 2 on the slave system, the timing marker causes an instruction (e.g., a sync instruction) to be executed. A sync instruction may cause the slave system to be configured to synchronize the local hardware and software counters, for example, which may include causing the software counter on the slave system to stop for the same predetermined period of time adjusted by an offset.

In one embodiment, the timing markers in program 1 and program 2 are configured in each program to execute on the same cycle when the programs are in sync, for example. However, in other embodiments the timing markers may be offset by a known number of cycles, which may be compensated for during the synchronization process by using different fixed delays, for example. In some embodiments, the time difference (or number of cycles), $\Delta t$, between each timing marker may be constrained within a range. For example, a minimum time difference between timing markers in program 1 and program 2 may be based on a time to communicate information between systems (e.g., a number of cycles greater than a message latency), and a maximum time difference between timing markers in program 1 and program 2 may be based on a tolerance of oscillators forming the time base on each system (e.g., if the time difference increases beyond a threshold for a given time base tolerance, it may become more difficult or impossible for the systems to synchronize for a given fixed delay). The minimum and maximum number of cycles may also be based on the size of a buffer (e.g., a first in first out (FIFO) memory) in each C2C circuit, for example.

In one example embodiment, the programs are components of a larger deterministic program generated by the same compiler (e.g., compiler 160 in FIG. 1). For example, a deterministic program may be distinguished from a non-deterministic program in that the operations performed by a deterministic program on each cycle are known prior to execution (although the particular numerical values processed may not be). Since each operation is known to occur on a particular cycle, execution of timing markers on the same cycles in each program on different systems may be performed in a reliable and predictable manner, for example, and the master and slave systems (so called for synchronization purposes) may be configured to send and receive synchronization information at known times within known time ranges, for example. In one example embodiment described in more detail below, a compiler receives an artificial intelligence (AI) model and generates a plurality of deterministic AI programs (or component programs of a larger program) comprising instructions for implementing the AI model on a plurality of different chips (e.g., an array of AI processor integrated circuits). The different integrated circuits may be configured in a network and run in parallel to increase AI data processing speeds and reduce the time to obtain AI results, for example.

Figure 4:
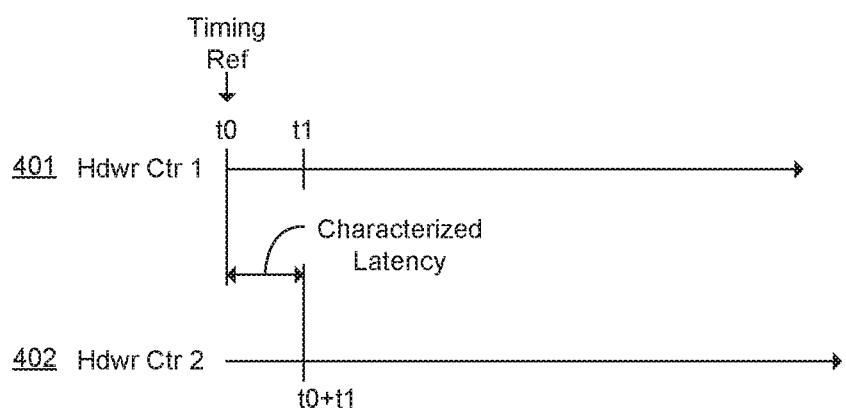
FIG. 4 illustrates synchronizing hardware counters according to one embodiment.

FIG. 4 illustrates synchronizing hardware counters according to one embodiment. FIG. 4 illustrates a timeline 401 for a hardware counter on a master system and a timeline 402 for a hardware counter on a slave system. As shown at 401, a hardware counter on a master system may initiate and send a timing reference at time t0. The timing reference may, for example, be embedded with data and transmitted from the master to the slave over the C2C interface, for example. The latency of such a transmission may be characterized and designed to be a known time delay, such as t1, for example. Accordingly, a slave hardware counter may be set to a corresponding value. Here, for a time delay of t1, the slave hardware counter (illustrated on timeline 402) is set to a value of t0+t1 so that the hardware counters in both systems are synchronized. In one embodiment, the timing reference may be bits (e.g., 8 bits) of a counter sent from the master to the slave to perform the synchronization, for example. As mentioned above, the frequency of the hardware counter synchronization may be greater than the frequency of the software counter synchronization, for example.

Figure 5:
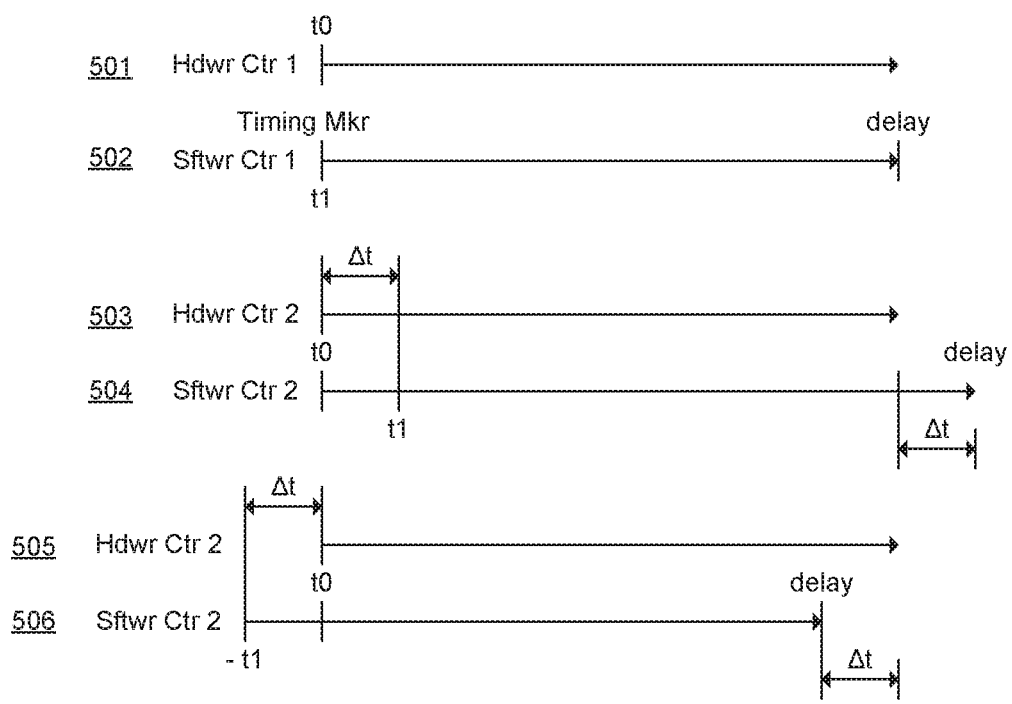
FIG. 5 illustrates synchronizing software counters according to one embodiment.

FIG. 5 illustrates synchronizing software counters according to one embodiment. In this example, timeline 501 illustrates a hardware counter on a first system and timeline 502 illustrates a software counter on the first system. Timeline 503 illustrates a hardware counter on a second system and timeline 504 illustrates a software counter on the second system, where the software counter on the second system has drifted behind the software counter on the first system. Timeline 505 illustrates a hardware counter on a second system and timeline 506 illustrates a software counter on the second system, where the software counter has drifted ahead of the software counter on the first system. On the first system, the hardware counter and software counter are in sync. When the program on the first system hits a timing marker t1, the software counter on the first system is stopped for a fixed delay as shown at 502. When the program on the second system hits a timing marker, a trigger is executed (at t1 on timeline 504) the software counter on the second system is stopped. Accordingly, a corresponding delay occurs in software counter 2. However, the second system software counter may be delayed by a nominal amount plus an offset. The nominal delay may be equal to the fixed delay of the software counter on the first system. Further, the delay in software counter 2 may be adjusted based on how far off the local software counter is from the local hardware counter (which is in sync with the hardware counter on the first system). For example, the fixed delay may be either increased or decreased by the amount of the different between the local hardware and software counters, Δt. Timelines 503 and 504 show a situation where the local software counter is behind the remote software counter (e.g., the timing marker in the local program is triggered after the timing marker in the remote program). Accordingly, the difference between the local hardware counter and local software counter reduces the fixed delay so that the delay on both remote and local software counters end at the same time, the software counters and programs on both systems may be restarted at the same time, for example, and the systems are brought back into sync. Timelines 505 and 506 show a situation where the local software counter is ahead of the remote software counter (e.g., the timing marker in the local program is triggered before the timing marker in the remote program). Accordingly, the difference between the local hardware counter and local software counter increases the fixed delay so that the delay on both remote and local software counters end at the same time, the software counters and programs on both systems may be restarted at the same time, for example, and the systems are brought back into sync.

Figure 6:
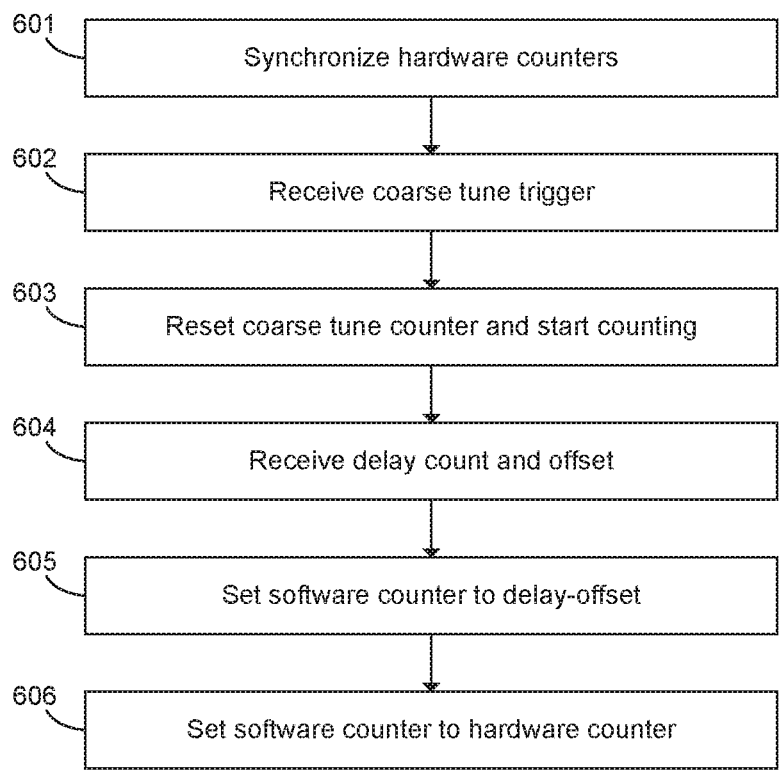
FIG. 6 illustrates coarse synchronization according to one embodiment.

FIG. 6 illustrates coarse synchronization according to an embodiment. During various points in operation, the first and second systems may be far out of sync. For example, during startup or after a restart (collectively, a "reset"), the system may need to undergo a coarse synchronization to bring the time bases close enough so they can be maintained in alignment using the techniques described above (e.g., within the resolution of the hardware and software counters, such as 8 bits). In one embodiment, the above described synchronization techniques may be used to maintain two systems in sync, but another coarse synchronization process may be used beforehand to make sure the system time bases are close enough to start a synchronization process, for example. In one embodiment, coarse synchronization of the software counter, as illustrated in FIG. 6, may occur during a reset phase of operation. For example, at 601, the hardware counters may be synchronized as described above. At 602, a master system, for example, may send a coarse tune trigger, which is received by a slave system, for example, over a high speed data communications link. At 603, a coarse tune counter on the slave system is reset (e.g., to 0) and starts counting, for example. The course tune counter may be a counter circuit, such as a 20 bit digital counter, for example. At 604, a delay count and offset instruction may be executed by the slave system. At 605, the software counter is set to a fixed delay in the delay count/offset instruction. The fixed delay may include a delay length large enough to cover multiple clock cycles, for example. The offset may be set to the value of the coarse counter at the time the delay/count instruction is executed on the slave. Both the master and the slave may be configured to undergo the same fixed delay. If the master and slave are in sync, then the delays on each system should be triggered at the same time. The offset on the slave adjusts the fixed delay on the slave so that the systems restart, after the delay, at the same time. Accordingly, the delay on the slave is adjusted by the value in the coarse counter to bring the software counters on the master and slave into coarse alignment, for example. At 606, the software counter is set to the value in the hardware counter.

Figure 7:
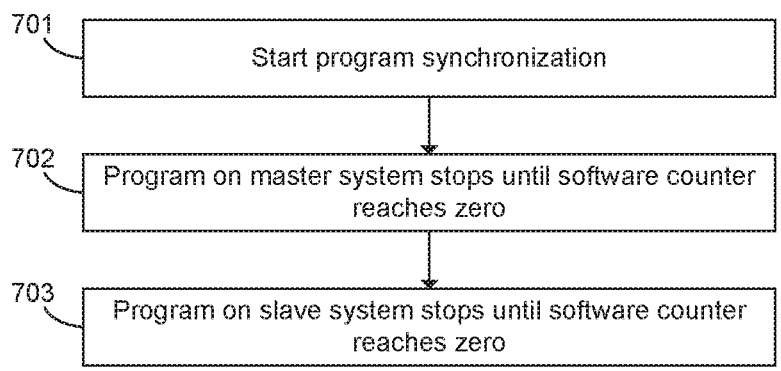
FIG. 7 illustrates fine program synchronization according to one embodiment.

FIG. 7 illustrates fine program synchronization according to one embodiment. This example illustrates synchronizing the first program and the second program on two different systems, such as a master and slave, for example. Course tune may get the clock periods aligned to a center of a period (w/in 180 degrees), for example, and fine tune may restarts both systems on the next zero. A fine tune instruction on the slave may initiate the process, for example. At 701, program synchronization starts. At 702, the program executing on the master system may stop execution until the software counter on the master system reaches zero. When a zero in the software counter is detected, the program on the master may start so that the program execution is aligned to the software counter. Similarly, the program executing on the slave system stops execution until the software counter on the slave system reaches zero. When a zero in the software counter is detected, the program on the slave may start so that the program execution is aligned to the software counter.

Figure 8:
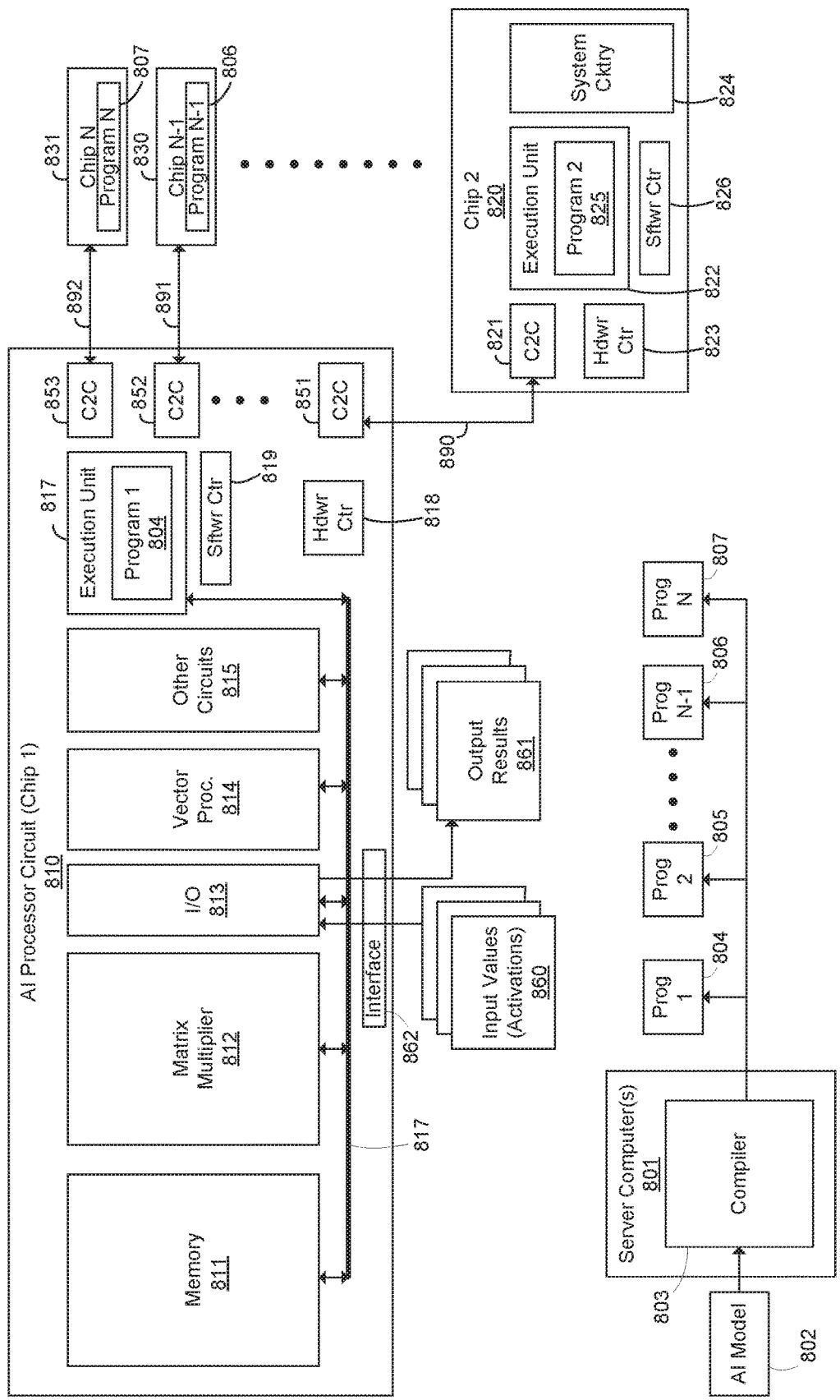
FIG. 8 illustrates an example of multichip synchronization according to another embodiment.

FIG. 8 illustrates an example of multichip synchronization according to another embodiment. In this example, an artificial intelligence (AI) model 802 is translated into a program comprising a plurality of program components 804-807, which may be loaded onto multiple AI processor circuits 810, 820, 830, 831 on N different ICs/chips (where N is an integer), for example. In one embodiment, AI model 802 is received by one or more server computers 801 and translated into multiple program components 804-807 using compiler 803. Program components 804-807 may be part of a deterministic AI program for implementing AI model 802, where the operations to be executed by each program component 804-807 on each AI processor are known and may be on particular cycles, for example. The program components 804-807 may be synchronized cycle for cycle across multiple chips, for example, to implement an AI algorithm. One or more AI processor circuits 810, 820, 830, 831 may receive inputs and send outputs over an interface 862, such as a PCIe interface, for example. For instance, the operations in each program may be used to process input values 860 (e.g., activations) to produce output results 861 on each chip. Results may be coupled back to the servers 801 (e.g., if they are final results), be stored in local memory on each chip, or be sent in whole or in part to other chips 820, 830, 831 over high speed communication links 890-892 for further processing, for example.

In this example, each AI processor includes a memory circuit 811, matrix multiplier circuit 812, input/output circuits 813, which may include switching circuits to route the inputs, outputs, and intermediate results, a vector processor circuit 814, and other circuits 815, for example. Each AI processor may further include C2C circuits 851-853, a hardware counter 818, and an execution unit 817 for executing one of the program components and a software counter 819. The C2C circuits on each chip allow data communication and synchronization operations to occur as described above, for example.

Figure 9:
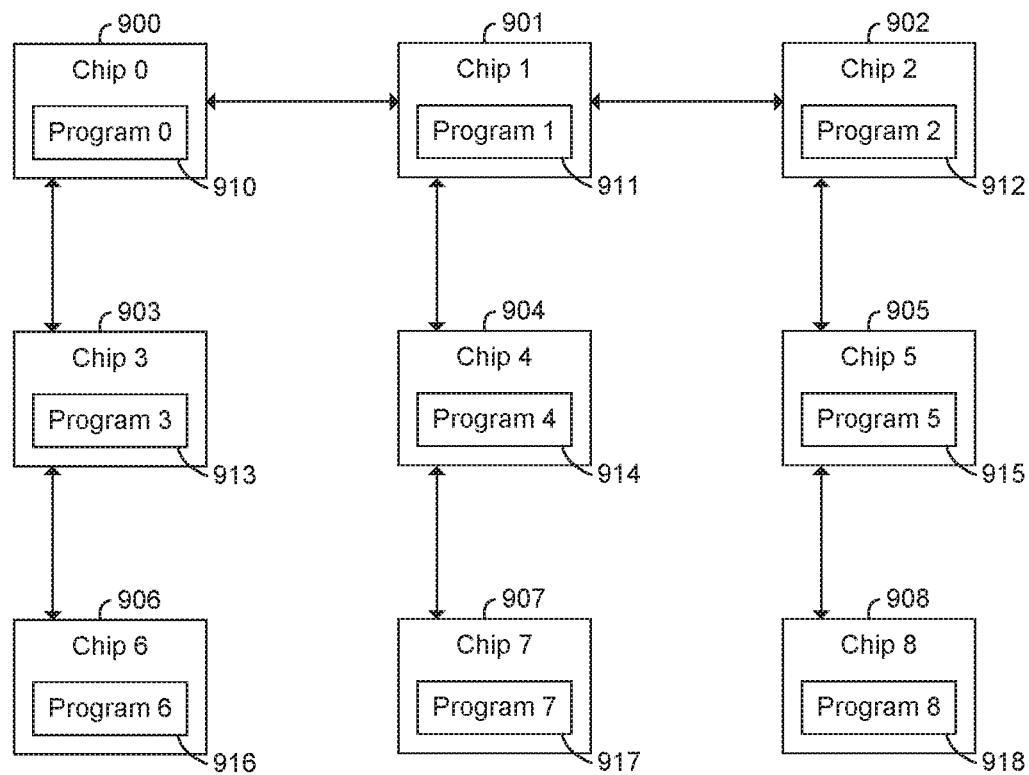
FIG. 9 illustrates an example of multichip synchronization according to yet another embodiment.

FIG. 9 illustrates an example of multichip synchronization according to yet another embodiment. In some embodiments, systems may be configured in a number of different configurations and synchronization may occur serially. For example, in one example implementation, chip 900 may be a master for chips 901 and 903, for example, yet chip 901 may be a master for chips 902 and 904. Accordingly, chip 900 may sync with chips 901 and 903, chip 903 may sync with chip 906, chip 901 may sync with chips 902 and 904, and so on. A chip having an upstream master may be a slave to the master, but if the chip has downstream connections the chip becomes the master to directly connected downstream chips after it has synchronized to the upstream master. The synchronization process may proceed serially across any number of different system topologies.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A method of synchronizing a plurality of electronic systems performed by a node system, the method comprising:
receiving one or more timing references from a primary system;
synchronizing, at a first frequency, a first counter of the node system with a first counter of the primary system in response to each of the one or more timing references;
executing one or more synchronization instructions generated by a program executing on the node system; and
synchronizing, in response each of the one or more synchronization instructions at a second frequency less than the first frequency, a second counter of the node system with the first counter of the node system synchronized with the first counter of the primary system to synchronize the program executing on the node system with a program executing on the primary system.

2. The method of claim 1, wherein the program executing on the node system and the program executing on the primary system comprise a plurality of timing markers configured to execute on a plurality of same cycles in the plurality of electronic systems.

3. The method of claim 1, wherein the program executing on the node system and the program executing on the primary system are generated by the same compiler.

4. The method of claim 1, wherein the program executing on the node system and the program executing on the primary system are components of a deterministic program, executing on first and second integrated circuits, for executing an artificial intelligence algorithm.

5. The method of claim 1, wherein synchronizing comprises delaying the second counter by a first delay plus an offset.

6. The method of claim 5, wherein the offset comprises a difference between a value in the first counter of the node system and a value in the second counter.

7. The method of claim 1, wherein the one or more timing references are received together with data in a packet from the primary system.

8. The method of claim 1, wherein the one or more timing references are received at least once during each of a plurality of first time periods, wherein the first time periods correspond to a predetermined maximum number of clock cycles.

9. The method of claim 1, wherein the one or more timing references are received at a higher frequency than executing the one or more synchronization instructions.

10. The method of claim 1, further comprising coarse synchronizing the second counter during a reset phase of operation, the coarse synchronizing comprising:
receiving a coarse tune trigger;
resetting and starting a third counter;
setting the second counter to a fixed delay adjusted by the third counter; and
setting the second counter to the first counter of the node system.

11. The method of claim 1, further comprising synchronizing the program executing on the node system and the program executing on the primary system, wherein the program executing on the node system stops execution until the second counter reaches zero, and wherein the program executing on the primary system stops execution until a second counter of the primary system reaches zero.

12. A plurality of electronic systems comprising a primary system and a node system, each of the electronic systems comprising:
a program, executable by the electronic system;
a hardware counter;
a software counter; and
a data communications circuit,
wherein one or more timing references are sent from the primary system to the node system to synchronize, at a first frequency, a hardware counter in the primary system with a hardware counter in the node system in response to each of the one or more timing references,
wherein one or more synchronization instructions are generated by a program executing on the node system, and
wherein the software counter in the node system is synchronized, at a second frequency less than the first frequency, with the hardware counter in the node system synchronized with the hardware counter in the primary system to synchronize the program executing on the node system with a program executing on the primary system, in response to each of the one or more synchronization instructions.

13. The system of claim 12, wherein the program executing on the primary system and the program executing on the node system comprise a plurality of timing markers configured to execute on a plurality of same cycles in the plurality of electronic systems.

14. The system of claim 12, wherein the program executing on the node system and the program executing on the primary system are generated by the same compiler.

15. The system of claim 12, wherein the program executing on the node system and the program executing on the primary system are components of a deterministic program, executing on first and second integrated circuits, for executing an artificial intelligence algorithm.

16. The system of claim 12, wherein a software counter in the primary system is delayed by a first delay, and wherein the software counter in the node system is synchronized by delaying the software counter in the node system by a first delay plus an offset.

17. The system of claim 16, wherein the offset comprises a difference between a value in the hardware counter in the node system and a value in the software counter in the node system.

18. The system of claim 12, wherein the one or more timing references are received in the node system together with data in a packet from the primary system.

19. The system of claim 12, wherein the one or more synchronization instructions are executed in the primary system and the node system at least once during each of a plurality of first time periods.

20. The system of claim 12, wherein the one or more timing references are received at a higher frequency than the one or more synchronization instructions are executed.

\* \* \* \* \*

UNITED STATES PATENT AND TRADEMARK OFFICE
CERTIFICATE OF CORRECTION

PATENT NO. : 10,824,188 B2
APPLICATION NO. : 16/247053
DATED : November 3, 2020
INVENTOR(S) : Gregory Michael Thorson and Srivathsa Dhruvanarayan Page 1 of 1

It is certified that error appears in the above-identified patent and that said Letters Patent is hereby corrected as shown below:

In the Claims

In Column 7, in Claim 1 at Line 57, after "in response" insert the word -- to --.

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*